United States Patent [19]

Van Horn

[11] 4,372,722
[45] Feb. 8, 1983

[54] HAY BALE TRAILER

[76] Inventor: Ronald L. Van Horn, Rte. 2, Box 237, Oakley, Calif. 94561

[21] Appl. No.: 181,897

[22] Filed: Aug. 27, 1980

[51] Int. Cl.³ .......................................... A01D 87/12
[52] U.S. Cl. ........................................ 414/44; 46/68; 46/96
[58] Field of Search ...................... 414/44, 46, 68, 96, 414/111, 492, 514

[56] References Cited

U.S. PATENT DOCUMENTS

| | | | |
|---|---|---|---|
| 3,197,043 | 7/1965 | Unger | 414/44 |
| 3,251,485 | 5/1966 | Fancher | 414/46 X |
| 3,278,049 | 10/1966 | Hollyday | 414/44 X |
| 3,278,050 | 10/1966 | Tarbox | 414/44 |
| 3,510,013 | 5/1970 | Best | 414/96 X |
| 4,249,843 | 2/1981 | Kerr | 414/492 X |

FOREIGN PATENT DOCUMENTS

| | | | |
|---|---|---|---|
| 769957 | 10/1967 | Canada | 414/492 |
| 2041551 | 4/1971 | Fed. Rep. of Germany | 414/68 |
| 2240902 | 2/1974 | Fed. Rep. of Germany | 414/68 |
| 2658082 | 7/1978 | Fed. Rep. of Germany | 414/44 |

Primary Examiner—Leslie J. Paperner
Attorney, Agent, or Firm—Blair, Brown & Kreten

[57] ABSTRACT

A trailer for hay bales which includes a wheeled body having a bottom provided with an opening beneath which an elongated platform is supported for vertical movement the forward end of the platform being adapted to successively pick up bales of hay from the ground and form a row of bales following which the platform is moved upwardly through the opening to deposit rows of bales in a stack successively within the body interior, each stack being moved transversely within the body interior by a slidably positioned side panel until the body interior is filled with stacks of bales in side-by-side abutting relationship following which all of the stacks are pushed out of the rear end of the body at a suitable location by a slidably disposed front panel on the body.

13 Claims, 4 Drawing Figures

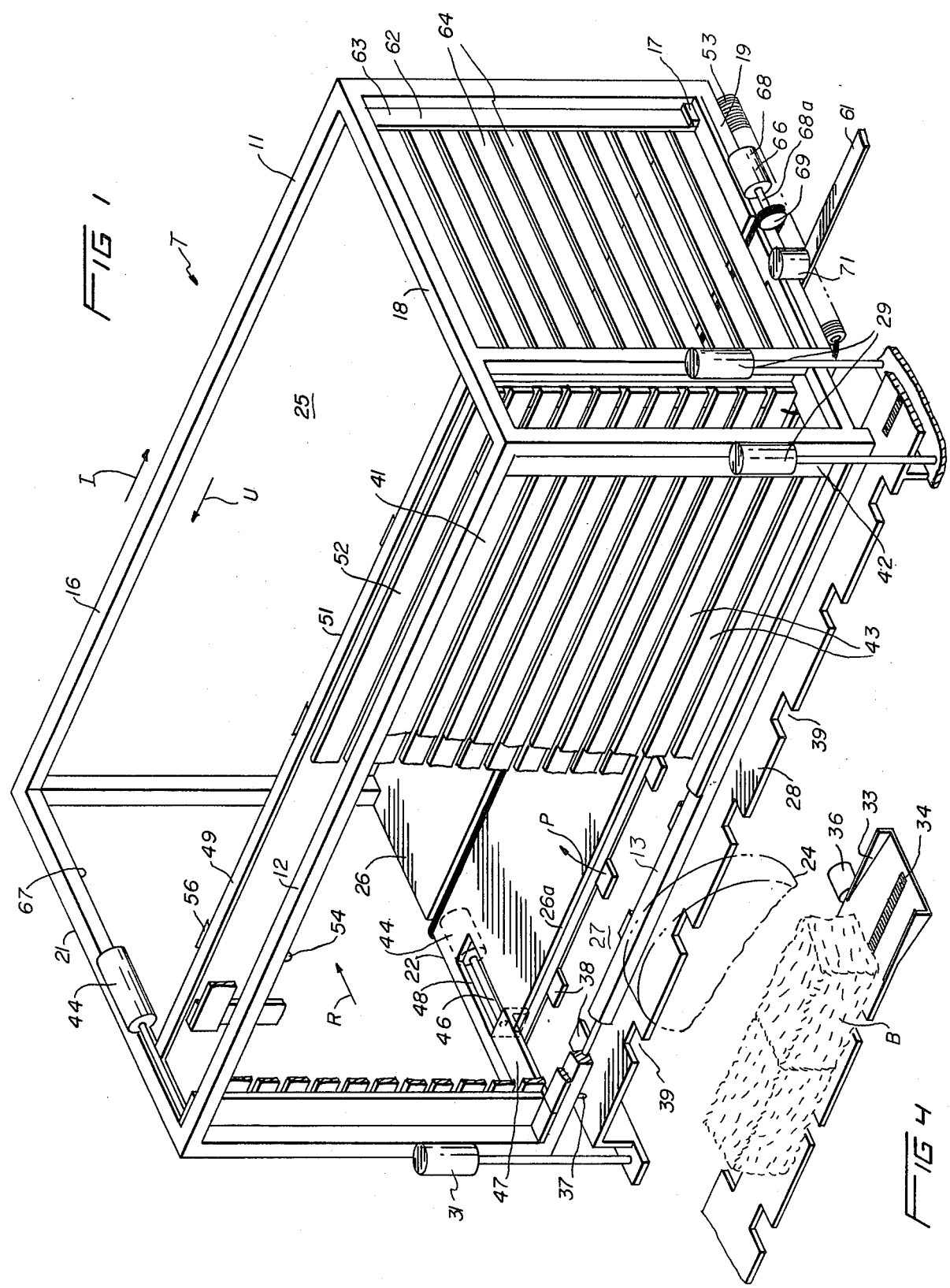

HAY BALE TRAILER

BACKGROUND OF THE INVENTION

In the typical hay cutting operation, hay is mowed and baled utilizing well known hay baling machines so that the baled hay remain on the ground adjacent the location where the cutting has occurred. Obviously, the littering of a hay field with such bales poses a collection problem in that it is common to store such bales in a barn loft or the like. Usually, the collection of such bales is done manually by workers who load the bales onto a truck or the like for transport to a storage site following which the bales are unloaded and stored in the barn. Under such conditions, the time required to pick up, transport and store such bales is extensive so that frequently during the course of a day all of the bales are not collected. Thus, uncollected bales are exposed to inclement weather resulting in deterioration of the hay. Furthermore, the cost of collecting and storing such bales can be considerable considering not only the time involved but the number of workers required at a time when adequate farm personnel are difficult if not impossible to obtain.

OBJECTS AND SUMMARY OF THE INVENTION

Accordingly, a primary object of this invention is to provide a new and novel trailer which permits bales of hay to be quickly picked up and moved to a storage location at a high rate and with a minimum of personnel.

Another object of this invention is to provide a new and novel trailer which is arranged to be pulled by a tractor or the like to pick up bales of hay from a field automatically and which permits transportation of a large number of such bales to a desired location.

A further object of this invention is to provide a new novel trailer for transporting bales of hay which automatically loads bales of hay as well as dumping the bales from a loaded trailer in a neat and undamaged condition.

Still another object of this invention is to provide a new and novel trailer for transporting bales of hay which is relatively simple and inexpensive in construction, which is capable of prolonged use without breakdown and which may be easily fabricated using standard components at a low cost.

The objects of the invention and other related objects are accomplished by providing a body having an interior for the storage of hay bales and wheels are provided on the body for travel on the ground. The body includes a bottom wall for supporting the loaded hay bales and an opening is provided in the body wall which extends fore and aft of the body adjacent one side. An elongated platform also extending fore and aft is mounted on the body for accommodating a row of hay bales in end to end relationship, the platform being mounted for vertical reciprocating movement from a loading position in aligned underlying relationship with the bottom wall opening through the opening into a stacking position above the opening for successively positioning a plurality of rows of bales in a vertically aligned stack in the interior of the body. Means are provided in the opening for retaining the lowermost row of blades in the stack over the opening and means are provided for sequentially moving the stack and successive stacks laterally from the stacking position towards the other side of the body with the stacks in side-by-side abutting relationship to store a plurality of stacks on the bottom wall within the body interior.

The above-mentioned and other features and objects of the present invention will become more apparent by reference to the following description taken in conjunction with the accompanying drawing wherein like reference numerals denote like elements.

BRIEF DESCRIPTION OF THE DRAWINGS

FIG. 1 is a perspective view partially broken away of the hay bale trailer of the invention;

FIG. 4 is a fragmentary view of a portion of the trailer of FIG. 1.

DESCRIPTION OF THE PREFERRED EMBODIMENT

Figure 3:
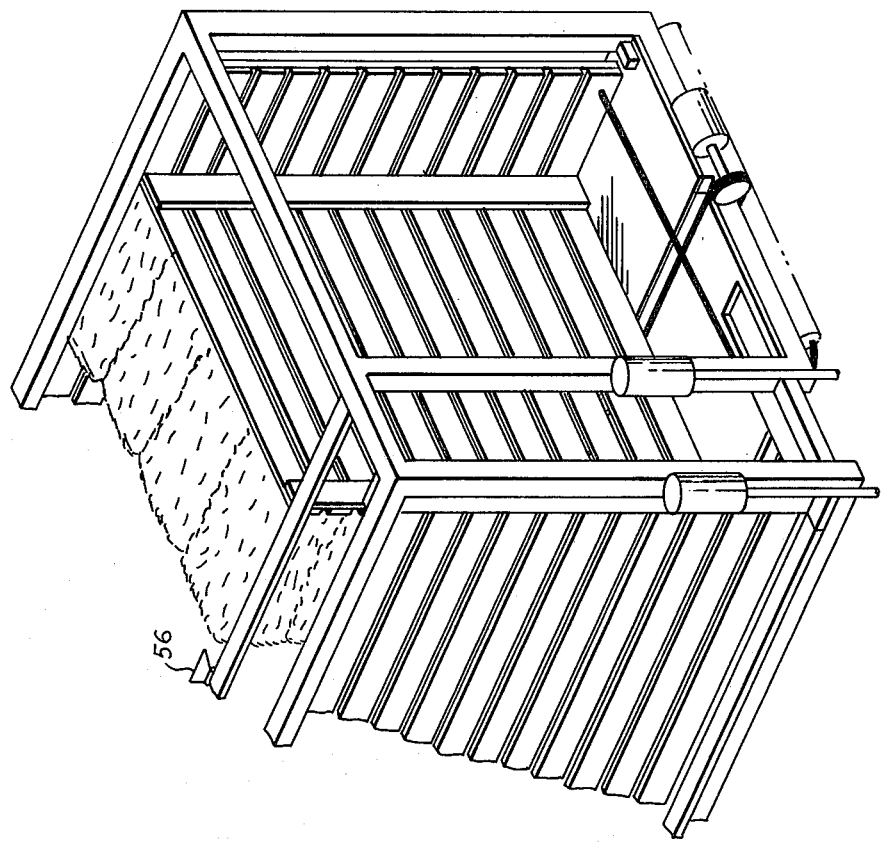
FIG. 3 is view similar to FIG. 2 showing the parts in another operating position.

Referring now to the drawings and to FIG. 1 in particular there is shown a hay bale trailer constructed in accordance with the invention and designated generally by the letter T. The trailer T includes a body 11 having upper and lower longitudinally extending frame members 12, 13 and 16, 17 on opposite sides of the body 11 which are interconnected by cross frame members 18, 19 and 21, 22 at the front and rear ends of the body 11 respectively as shown. The body 11 which is provided with an interior 25 is supported for travel on the ground by means such as a pair of wheels 24.

The body 11 is provided with a bottom wall 26 for supporting loaded bales of hay as will be explained hereinafter, one edge 26a of the bottom wall 26 defining with one side of the body 11 such as frame member 13 a longitudinally extending opening 27. Shelf means such as a platform 28 is suitably supported by means of a plurality of first hydraulic cylinder/piston assemblies 29, 31 for vertical movement between a loading position in underlying aligned relationship with the opening 27 as shown in FIG. 1 and a stacking position within the interior 32 of the body 11. The platform 28 is arranged to accommodate a row of hay bales in endwise abutting engagement as shown best in FIG. 4. The platform 28 together with a row of bales B is arranged to be moved upwardly from the position shown in FIG. 1 through the opening 27 into the interior 25 of the body 11.

The forward end of the platform 28 is provided with a shovel-shaped end portion 33 which in the solid line position of FIG. 1 is arranged to scoop up hay bales B deposited on the ground during a cutting and baling operation. The platform 28 is supported on the body with a slight clearance between the end portion 33 and the ground for permitting the end portion 33 to move under a hay bale during the travel of the trailer T on the ground in the direction of the arrow I.

Preferably, conveyor means such as conveyor chain 34 or the like is provided in the end portion 33 of the platform 28 and the conveyor chain 34 is suitably driven by means such as a motor 36 so that each scooped up hay bale B is moved along the platform 28 as such successive hay bale B is moved onto the platform 28.

When a complete row of hay bales B are thus positioned on the platform 28, the rearmost hay bale B engages a switch 37 which actuates the cylinder/piston assemblies 29 so as to move the platform 28 upwardly through the opening 27 into the body interior 25. Means are provided within the opening 27 for retaining the row of hay bales B over the opening 27. More specifically, a plurality of flaps 38 are pivotally mounted on the body 11 for movement from a stop position within the opening 27 upwardly in the direction of the arrow P to permit the row of hay bales B and platform 28 to move through the opening 27. When the platform 28 is moved downwardly into the loading position of FIG. 1, the flaps 38 return to the position shown in FIG. 1 thereby retaining the lowermost row of hay bales 8 within a stacking position over the opening 27. The platform 28 is provided with notches 39 which are spaced so as to correspond with the spacing of the flaps 38 thereby providing a clearance with the flaps 38 as the platform 28 moves upwardly through the opening 27.

As it can be understood as each row of hay bales B are moved into the stacking position over the opening 27 each successive row of bales moves the previously inserted row upwardly until ultimately a plurality of rows of bales in a vertically aligned stack are loaded in the body interior over the opening 27. Means are provided on the body 11 for sequentially moving the stack of rows of bales B and successive stacks laterally from the stacking position toward the other side of the body 11 with the stacks in side-by-side abutting relationship to store a plurality of stacks on the bottom wall 26 within the body interior 25. More specifically, a first panel 41 is guidably mounted adjacent the one side of the body for transverse movement within the body interior 25 between the side edges of the opening 27. In the illustrated embodiment, the first panel 41 preferably includes a frame 42 and a plurality of slats 43 secured thereto and the panel 41 is arranged to be moved in the direction of the arrow R by means of a plurality of second hydraulic cylinder/piston assemblies 44. The cylinder/piston assemblies 44 include a piston 46 connected at one end to a bracket 47 secured at the outer end to the lower edge portion of the first panel 41 at each end. Slots 48 are provided in the bottom wall 26 for accommodating the bracket 47 and the stroke of the piston 46 upon actuation of the cylinder/piston assembly 44 is of a length to move the first panel 41 across the opening 27 laterally thereby pushing the stack of bales B onto the adjacent edge portion of the bottom wall 26.

Figure 2:
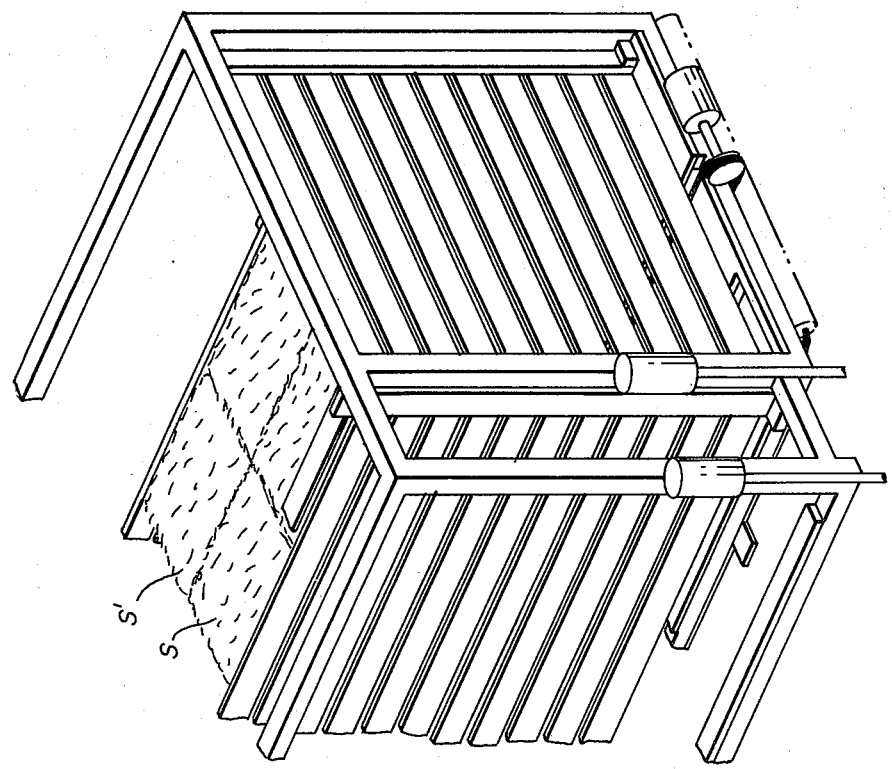
FIG. 2 is a perspective end view of a portion of the trailer of FIG. 1 showing the parts in one operating position.

Means are provided on the body 11 for yieldingly retaining the vertically aligned stack of hay bales and successive stacks in the side-by-side abutting relationship as shown best in FIGS. 2, 3. More specifically, a second panel 49 is disposed within the body interior 25 and, in the illustrated embodiment, includes a frame 51 having a plurality of horizontally extending vertically spaced slats 52 secured thereto. The second panel 49 is yieldingly urged toward the first panel 41 by means such as springs 53 so that as each stack of bales B is moved onto the bottom wall 26 by the first panel 41, the second panel 49 moves incrementally the width of the stack as each successive stack is moved onto the bottom wall 26 as shown best in FIG. 2. The actuation of the movement of the first panel 41 by the cylinder/piston assemblies 44 is accomplished by means of a switch 54 which is engaged by the uppermost row of bales B when the stack reaches its full height. Means are provided for retaining the loaded stacks of bales B in the side-by-side relationship as shown in FIG. 2, 3 which, in the illustrated embodiment, includes a plurality of longitudinally spaced, pivotally mounted tines 56 suitably mounted on the upper edge portion of the second panel 49 for piercing engagement with the upper end of the foremost stack of bales identified in FIG. 2 by the letter S'.

When the interior 25 of the body 11 has been fully loaded with stacks of bales B as shown in FIG. 3, the trailer T may be moved to a suitable location for unloading. To this end, the body 11 is provided with a tongue 61 secured at its rear end to the underside of the body 11 in any suitable manner. The front end of the tongue 61 is adapted to be connected to associated prime mover such as a tractor or the like (not shown).

The trailer T of the invention includes means for removing the plurality of stored stacked bales from the body interior 25 which includes a third panel 62 including a frame 63 having a plurality of horizontally extending spaced-apart slats 64 secured thereto. The third panel 62 in guidably mounted for movement between the front and rear ends of the body 11. In the loaded condition of the trailer T, the front panel 62 occupies the position shown in FIG. 1 and a winch 66 is suitably mounted on the body 11 for moving the panel 62 to the rear of the body 11 to push the stacks of bales out of the rear end of the body 11 which is provided with a rear opening 67. The winch 66 includes a hydraulic motor 68 having an output shaft 68a on which a pulley and chain arrangement 69 are drivably connected, the chain being also connected to the front panel 62. Thus, when the motor 66 is actuated, the chain is advanced carrying with it the front panel 62 as shown best in FIG. 3 in the direction of the arrow U.

In order to facilitate the unloading of the trailer T, a hydraulic cylinder/piston assembly 71 is positioned on the front end of the body 11 and its piston is arranged to engage the upper surface of the tongue 61. With the hydraulic cylinder/piston assembly 71 is actuated, the piston moves downwardly as viewed in FIG. 1 against the tongue 61 moving the body 11 upwardly in a tilted manner so that the bottom wall 26 of the body 11 is disposed at an angle facilitating the shifting rearwardly of the stacks of bales B out of the body interior 25 as they are pushed by the front panel 62.

Having thus described the preferred embodiment of the invention it should be understood that numerous structural modifications and adaptations may be resorted to without departing from the spirit of the invention.

What is claimed is:

1. A hay bale trailer comprising, in combination, a body having an interior for the storage of hay bales, means for supporting said body for travel on the ground, a bottom wall on said body for supporting said stored hay bales, said bottom wall having a longitudinally extending opening adjacent one side of said body, shelf means mounted on said body for accommodating a row of hay bales in aligned underlying relationship with said opening, means for moving said shelf means vertically through said opening between a loading position below said opening and a stacking position above said opening to successively position a plurality of rows of bales in a vertically aligned stack in said body interior, means within said opening for retaining lowermost row of bales in said stack over said opening and means for sequentially moving said stack and successive stacks laterally from said stacking position towards the other side of said body with said stacks in side-by-side abutting relationship to store a plurality of stacks on said bottom wall within said body interior, wherein said shelf means includes a longitudinally extending platform mounted on said body in underlying aligned relationship with said opening, said platform having a substantially shovel-shaped portion on the forward end of said platform extending forwardly of said body for scooping up bales of hay successively from the ground during the travel of said body to position a row of bales on said platform.

2. A hay bale trailer in accordance with claim 1 wherein said body is provide with an open rear end and including means on said body for removing said plurality of stored stacks of bales from said body interior through said open rear end.

3. A hay bale trailer in accordance with claim 2 wherein said means for moving said plurality of stored stacks of bales from said body interior includes a third panel mounted on the front end of said body for sliding movement between the front and rear end of said body to push said stored stacks of bales through said open rear end and means for moving said third panel between said front and rear ends of said body.

4. A hay bale trailer in accordance with claim 3 wherein said means for moving said third panel includes a winch mounted on said body, said winch including a reversible hydraulic motor and a cable drivably connected to said hydraulic motor and to said third panel.

5. A hay bale trailer in accordance with claim 4 including a longitudinally extending tongue pivotally attached at one end to the underside of said body and having the other end projecting forwardly from the front of said body for attachment of an associated prime mover or the like, a hydraulic cylinder/piston assembly mounted on said body said piston connected to said tongue adjacent said other end and means for actuating said hydraulic cylinder/piston assembly being arranged to tilt said body for lowering said body rear end during the pushing of said stored stacks of bales through said body open rear end.

6. A hay bale trailer in accordance with claim 1 wherein said stack moving means includes means for yieldingly retaining said stack and successive stacks in said side-by-side abutting relationship.

7. A hay bale trailer in accordance with claim 6 wherein said stack moving means includes a vertically disposed first panel guidably mounted adjacent said body one side for transverse sliding movement within said body interior between the side edges of said opening and means for moving said first panel reciprocally between said opening side edges to move said stack from said stacking position to a storage position adjacent said opening.

8. A hay bale trailer in accordance with claim 7 wherein said retaining means includes a vertically disposed second panel guidably mounted for transverse sliding movement within said body interior in substantially parallel relationship with said first panel and means for yieldingly urging said second panel into abutting engagement with the opposite side of said stack from said first panel to permit storage of said stack and successive stacks in said body interior.

9. A hay bale trailer in accordance with claim 8 wherein said shelf means includes a longitudinally extending platform mounted on said body in underlying aligned relationship with said opening, said platform having a substantially shovel-shaped portion on the forward end of said platform extending forwardly of said body for scooping up bales of hay successively from the ground during the travel of said body to position a row of bales on said platform.

10. A hay bale trailer in accordance with claim 7 wherein said means for moving said first panel comprises a plurality of second hydraulic cylinder/piston assemblies mounted on said body with said pistons connected to said first panel and switch means activated by said vertically aligned stack of bales in said stacking position for activating said second hydraulic cylinder/piston assemblies to move said first panel transversely for moving said stack from said stacking position onto the portion of said bottom wall adjacent said opening.

11. A hay bale trailer in accordance with claim 1 including a conveyor on said shovel-shaped portion for moving successive bales positioned thereon along said platform with said bales in aligned abutting relationship.

12. A hay bale trailer in accordance with claim 1 wherein said means for retaining the lowermost row of bales comprises a plurality of longitudinally spaced flaps pivotally mounted within said opening along the side edges of said opening, said flaps being pivotally movable from a horizontally extending stop position within said opening for supporting said lowermost row of bales and a upwardly extending clearance position to permit movement of said platform with said row of bales through said opening and wherein the side edges of said platform are provided with a plurality of notches spaced correspondingly with the gap between said flaps to permit movement of said platform from said stacking position to said loading position.

13. A hay bale trailer in accordance with claim 1 wherein said means for moving said platform includes a plurality of first hydraulic cylinder/piston assemblies mounted on said body with said pistons connected to said platform and switch means for activating said first hydraulic cylinder/piston assemblies when a row of bales is positioned on said platform.

* * * * *